US005325274A

United States Patent [19]
Mays

[11] Patent Number: 5,325,274
[45] Date of Patent: Jun. 28, 1994

[54] INTEGRATED DRIVING LIGHT SYSTEM

[76] Inventor: Audie L. Mays, 1608 Eton Way, Crofton, Md. 21114

[21] Appl. No.: 45,795

[22] Filed: Apr. 15, 1993

[51] Int. Cl.$^5$ .............................................. B60Q 1/18
[52] U.S. Cl. ...................................... 362/66; 362/83.1
[58] Field of Search ........................ 362/61, 66, 72, 80, 362/83.1, 83.3, 135

[56] References Cited

U.S. PATENT DOCUMENTS

| | | |
|---|---|---|
| 2,595,331 | 5/1952 | Calihan et al. ........................ 362/135 |
| 5,079,685 | 1/1992 | Osborn ................................... 362/66 |

Primary Examiner—Ira S. Lazarus
Assistant Examiner—L. Heyman
Attorney, Agent, or Firm—Morton J. Rosenberg; David I. Klein

[57] ABSTRACT

A system (100) for integrating a driving light (120) with a vehicle's external rear viewing mirror assembly (10) is provided. The driving light system (100) includes a lamp housing (110) having a pair of open opposing ends (104, 106) formed by a wall (102) having a tubular contour. The lamp housing (110) is mountable to an external rear viewing mirror assembly (10) by means of a tab (112) having a portion (116) thereof engageable within a recess portion (16) of the vehicle's rear viewing mirror frame assembly (14), and a fastener (108) which extends through a through opening (117) formed in the tubular wall (102) for engagement with a through opening (18) formed in a portion of the frame assembly (14) of the rear viewing mirror assembly (10). A lamp assembly (120) is disposed in the open end (104) of tubular housing (110), and coupled to the tubular wall (102) for displacement in two orthogonal directions, independent of an adjustable mirror (12) of the rear viewing mirror assembly (10). The system further includes a vertical adjustment assembly (130) rotatively coupled to the tubular wall (102) for displacing the lamp assembly to adjust the light output therefrom in a vertical direction. Additionally, the system includes a horizontal adjustment assembly (150) rotatively coupled to the tubular wall (102) for displacing the lamp assembly to adjust the light output therefrom in a horizontal direction.

20 Claims, 6 Drawing Sheets

INTEGRATED DRIVING LIGHT SYSTEM

BACKGROUND OF THE INVENTION

1. Field of the Invention

This invention directs itself to vehicle lighting systems. In particular, this invention directs itself to a modular light system fabricated for retrofit to a vehicle's mirror assembly. Still further, this invention directs itself to an integrated driving light system wherein the lamp assembly is coupled to a tubular housing by a multi-axis mounting assembly. More in particular, this invention is directed to an integrated driving light system wherein the lamp assembly is displaceable in either of two orthogonal directions by means of individual controls extending through the system's housing.

2. Prior Art

Vehicle lighting systems are well known in the art. Some prior art vehicle lighting systems include mirror units incorporated therewith, however, such systems do not have provisions for adjusting the light beam direction independent of any mirror adjustment. In particular, no prior art systems are known for providing adaptability to motorcycle mirror assemblies to provide an increase in the focused light distance in front of the motorcycle.

SUMMARY OF THE INVENTION

An integrated driving light system for a vehicle is provided. The driving light system includes a lamp housing having a pair of open opposing ends and being defined by a wall having a tubular contour. The lamp housing is mountable to an external rear viewing mirror assembly of a vehicle at a first of the pair of open opposing ends. The driving light system further includes a lamp assembly disposed in the second of the pair of open opposing ends of the lamp housing for providing additional lighting for the vehicle. The lamp assembly is coupled to the tubular wall for displacement in two orthogonal direction an adjustable mirror of the rear viewing mirror assembly. An assembly is also provided for displacing the lamp assembly in a first of the two orthogonal directions, the displacement assembly being coupled to the tubular wall. A second assembly for displacing the lamp assembly in a second of the two orthogonal directions is also provided, and coupled to the tubular wall.

It is an object of the present invention to provide a lighting system which can be integrated into the rear viewing mirrors of a motorcycle, such as the Honda GL 1500.

It is a further object of the present invention to utilize the additional height of the mirror location, above the motorcycle headlight, to create an enhanced recognizable cycle profile for oncoming motorists.

It is still a further object of the present invention to provide adjustment of the light beam focus point through a pair of control knobs for deflection thereof in either of two orthogonal directions, allowing the motorcycle rider to achieve maximum road coverage with the focused light beam pattern.

These and other objects and novel features of the invention will become apparent from the following detailed description when considered in connection with the accompanying drawings wherein:

DESCRIPTION OF THE PREFERRED EMBODIMENTS

Referring to FIGS. 1-8, there is shown integrated driving light system 100 for providing additional lighting to a vehicle. As will be seen in following paragraphs, the integrated driving light system is specifically directed to the concept of integrating additional lighting into a vehicle's structure in an aesthetically pleasing manner. Integrated driving light system 100 is particularly adapted for coupling to a vehicle external rear view mirror assembly 10, providing a position from which a roadway in front of the vehicle can be well lit. Although not restricted to utilization on any particular type of vehicle, integrated driving light system 100 is particularly adapted for mounting on the Honda GL1500 motorcycle.

With respect to use on motorcycles, system 100 in addition to improving visibility of the roadway, substantially improves the visibility of the motorcycle with respect to other vehicles. Motorcycle headlights are typically mounted a small distance above the front wheel, which makes them relatively low with respect to the rear end of most automobiles. Thus, when such motorcycles are being driven behind an automobile, the automobile driver may not see the motorcycle's headlight through his rear view mirror, creating an unsafe condition for the motorcyclist. System 100 being located substantially above the motorcycle headlight, is sufficiently high to easily be seen through the rear view mirror of an automobile preceding the motorcycle, thereby making the automobile driver aware of the motorcyclist's presence, and providing a more safe condition for the motorcyclist.

Figures 1, 2:
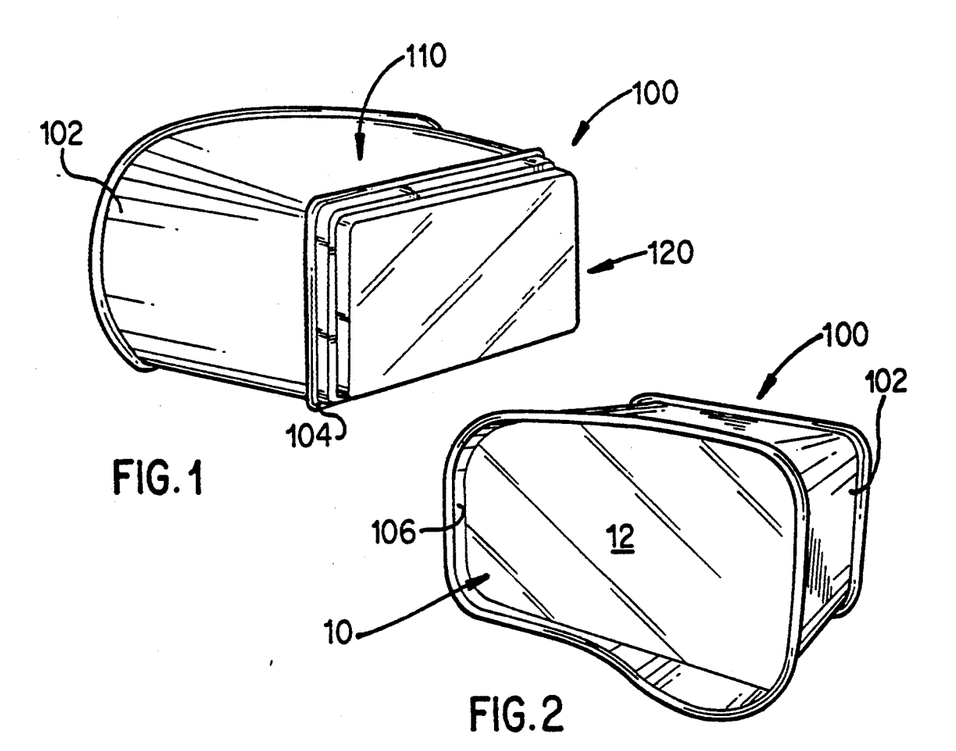
FIG. 1 is a front perspective view of the integrated driving light system.
FIG. 2 is a rear perspective view of the integrated driving light system.

Referring to FIGS. 1 and 2, there is shown integrated driving light system 100 having a housing 110 formed by a tubular wall 102 with opposing open ends 104 and 106. A lamp assembly 120 is mounted within the open end 104 of housing 110 and the vehicle's external rear view mirror assembly 10 is disposed within the opposing open end 106 of housing 110. As will be described in following paragraphs, system 100 is coupled to the frame of the external rear view mirror assembly 10 to thereby permit the mirror 12 to be visible through the open end 106 of housing 110, and to remain independently adjustable of the lamp assembly 120.

Figure 3:
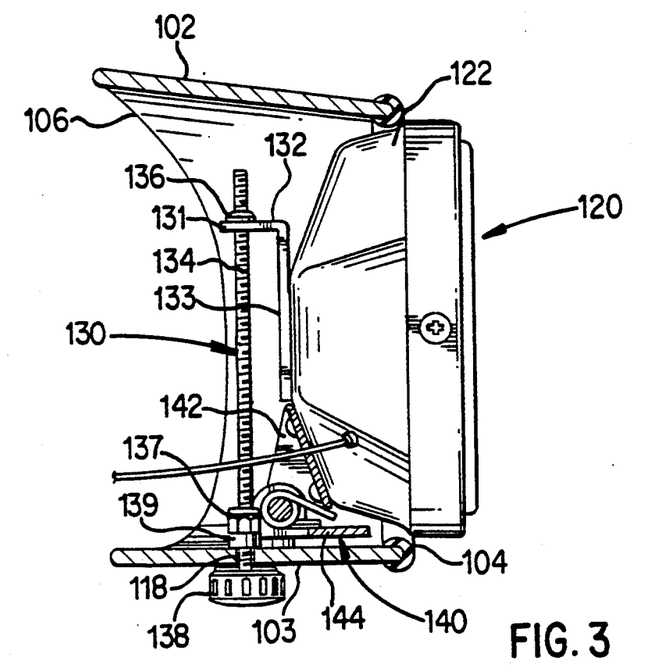
FIG. 3 is a partial sectional elevation view of the integrated driving light system.
Figure 4:
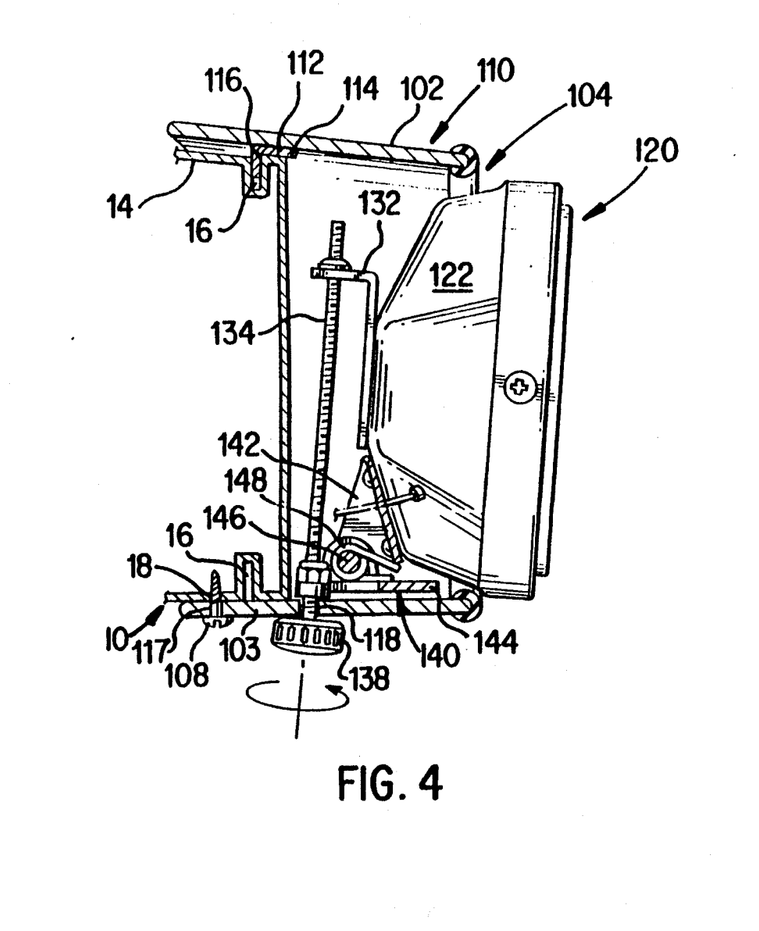
FIG. 4 is a partial sectional elevation view of the integrated driving light system depicting its coupling to a vehicle mirror frame.
Figure 7:
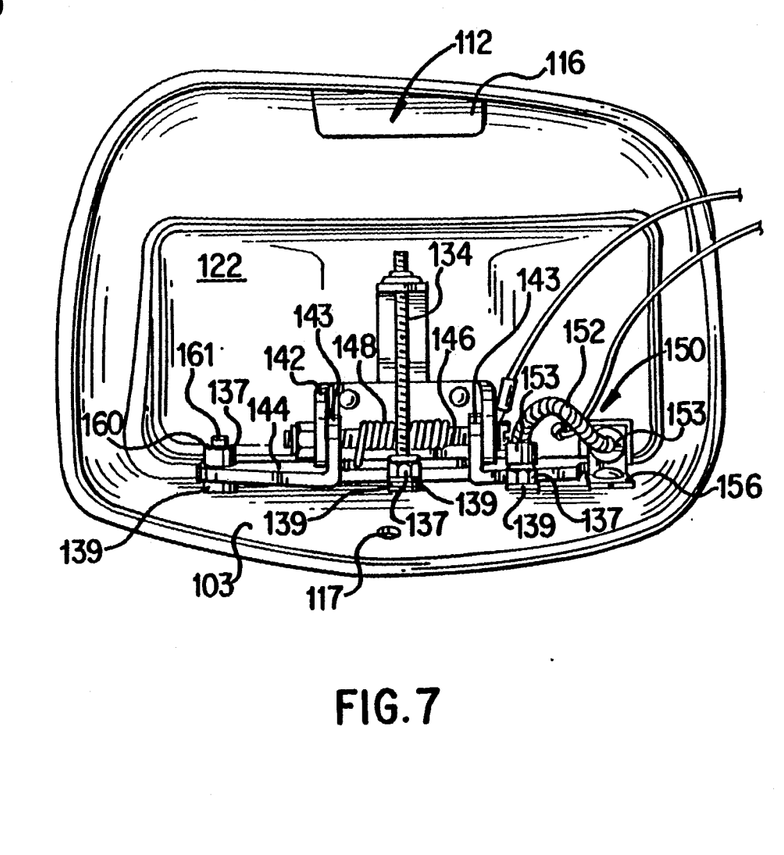
FIG. 7 is a rear perspective view of the integrated driving light system.

Referring now to FIGS. 3, 4 and 7, there is shown lamp assembly 120 coupled to tubular wall 102 of housing 110 by means of a multi-axis mounting assembly 140. Multi-axis mounting assembly 140 permits the lamp assembly to be adjusted in two orthogonal directions, thereby permitting the light beam produced by lamp assembly 120 to be adjusted in both vertical and horizontal directions. The multi-directional adjustment permits a pair of driving light units 100, mounted to mirror assemblies on opposing sides of the vehicle, to be adjusted such that the light beams converge at a desired position to provide maximum road coverage with the lighting pattern. Lamp assembly 120 is hingedly coupled to a support bracket 144, the support bracket being pivotally coupled to a lower portion 103 of tubular wall 102. The combination of the two pivotal couplings providing a multi-axis mounting for lamp assembly 120.

Lamp assembly 120 is hingedly coupled to bracket 144 by means of the bracket member 142 having a central portion fixedly coupled to a lower portion of the reflector housing 122 of lamp assembly 120. Bracket 142 has a substantially U-shaped contour with the opposing extending ends each having a through opening formed therein for passage therethrough of a hinge pin 146. Hinge pin 146 passes through a pair of tab portions 143, formed in bracket 144, to provide the hinged coupling between brackets 142 and 144. A torsion spring 148 is disposed on hinge pin 146 to provide a torsional bias against which the vertical adjustment assembly 130 operates. Thus, displacement of lamp assembly 120 about the pivot point defined by hinge pin 146 provides for vertical displacement of the light beam output therefrom.

The vertical adjustment assembly 130 includes a vertical adjustment bracket 132 having a substantially L-shaped contour, with one leg 133 fixedly coupled to a rear portion of reflector housing 122, and the other leg 131 is vertically displaced from the pivot defined by hinge pin 146 and adapted for receiving a threaded shaft 134. Portion 131 of bracket 132 may be adapted for receiving threaded shaft 134 by means of a threaded through opening, or alternately by means of a threaded nut 136 fixedly coupled to leg 131 of bracket 132, in axial alignment with a through opening formed therein. The opposing end of threaded shaft 134 is rotatively coupled to the bottom portion 103 of tubular wall 102. Threaded shaft 134 extends through a through opening 118 formed in tubular wall 102 for coupling with a control knob 138.

Through opening 118 has a diameter which is substantially larger than the diameter of threaded shaft 134, to allow angular displacement therein, the importance of which will be described in following paragraphs. Shaft 134 is vertically fixed to tubular wall 102 by means of the control knob 138 external to tubular wall 102, and by a lock nut 137 disposed on the interior side of tubular wall 102. The rotative coupling of threaded shaft 134, through tubular wall 102, may include one or more washers 139. Washers 139 may be formed of a plastic material composition having a relatively high lubricity. Thus, by rotating knob 138 the bracket portion 131 is displaced vertically along the threaded shaft, either up or down depending upon the direction of rotation of shaft 134. Since lamp assembly 120 pivots about the hinge pin 146, the displacement of bracket 132 on threaded shaft 134 causes an arcuate displacement of bracket 132 with respect to the tubular wall 102, requiring shaft 134 to be angularly displaceable. Threaded shaft 134 is angularly displaceable with respect to tubular wall 102 by virtue of the oversize opening 118. As shown in FIG. 4, threaded shaft 134 is free to pivot within the through opening 118. Sufficient angular displacement of threaded shaft 134 through opening 118 is obtained to permit the several degrees of displacement of lamp assembly 120 required to provide proper adjustment of the light beam emanating therefrom.

Figure 5:
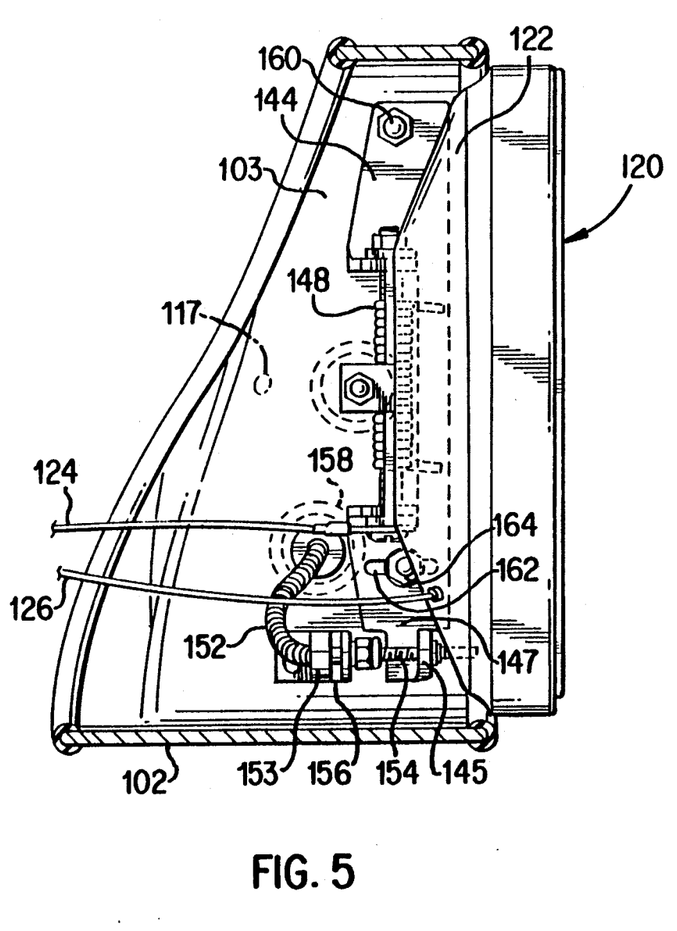
FIG. 5 is a partial sectional plan view of the integrated driving light system.
Figure 6:
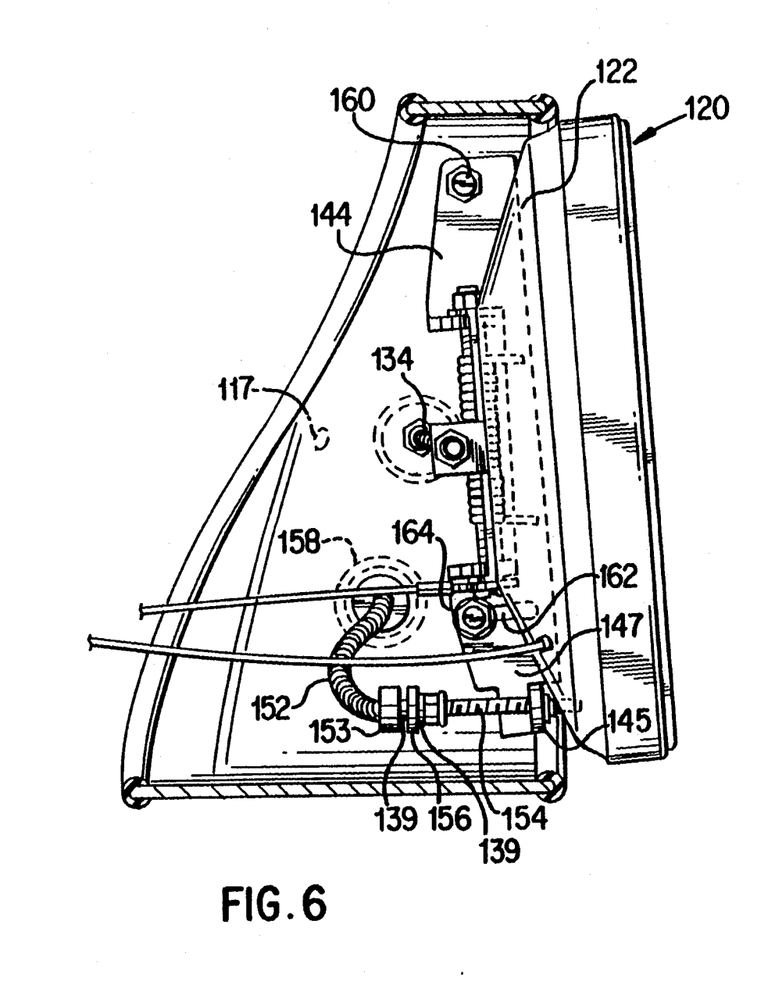
FIG. 6 is a partial sectional plan view of the integrated driving light system depicting horizontal displacement of the lamp assembly.

Referring now to FIGS. 5, 6 and 7, the horizontal adjustment assembly 150 is shown for displacing the lamp assembly 120 about the pivotal coupling 160 of bracket 144. Bracket 144 is coupled on one end to tubular wall 102 by means of the pivotal coupling 160. Pivotal coupling 160 may be formed by a threaded pin extending through the bottom portion 103 of tubular wall 102 and a through opening formed in bracket 144, the bracket 144 being loosely sandwiched between a washer 139 and the lock nut 137. In order to provide stability for the mounting of bracket 144, the opposing end of bracket 144 is coupled to the bottom portion 103 of tubular wall 102 by means of a fastener 164 extending through a slotted through opening 162 formed in portion 147 of bracket 144. The slotted through opening 162 permits bracket 144 to be rotatively displaced with respect to the pivotal coupling 160 while providing firm support for lamp assembly 120. The bracket 144 is rotatively displaced, with respect to pivotal coupling 160, by means of the horizontal adjustment assembly 150.

Horizontal adjustment assembly 150 includes a threaded shaft 154 threadedly engaged with a tab portion 145 of bracket 144. The tab portion 145 is formed in portion 147 of bracket 144 for threaded engagement with threaded shaft 154, providing horizontal displacement of the light beam emanating from lamp assembly 120 responsive to rotation of shaft 154. Tab 145 may be provided with an internally threaded through opening, or alternately have an internally threaded nut fixedly coupled to tab 145 and axially aligned with a through opening formed therein. Threaded shaft 154 extends from a rotative coupling with a support bracket 156 to tab 145. Threaded shaft 154 passes through a through opening formed in bracket 156 for connection to the shaft coupling 153. Bracket 156 is affixed to the bottom portion 103 of tubular wall 102. The through opening, through which the threaded shaft 154 extends, is significantly larger than the diameter of shaft 154 to permit angular displacement thereof, as was previously described for opening 118 and shaft 134. The oversize hole through bracket 156 permits the tab portion 145 of bracket 144 to be displaced on threaded shaft 154 for displacement of lamp assembly 120 about the pivot connection 160.

The coupling 153 provides a connection between the threaded shaft 154, extending through bracket 156, with a flexible shaft member 152, the flexible shaft 152 being in turn coupled to a control knob 158 (shown in phantom) disposed on the opposing side of tubular wall 102. Knob 158 may be coupled to flexible shaft 152 by means of a solid shaft member extending through an opening formed in the lower portion 103 of tubular wall 102, secured thereto by means of a lock nut 137 threadedly engaged with the solid shaft member, the lock nut 137 being disposed on a washer 139. The solid shaft member being coupled to flexible shaft 152 by means of a shaft coupling 153. The use of flexible shaft 152 permits both the vertical and horizontal adjustment knobs to be disposed adjacent one another on the bottom side of housing 110.

As shown in FIGS. 4 and 7, system 100 includes a mounting tab 112' having a substantially L-shaped contour for engagement with the vehicle's rear view mirror assembly 10. Tab 112' includes a first portion 114 fixedly coupled to an interior surface of tubular wall 102. A second portion 116' of tab 112' extends from the interior surface of tubular wall 102 for engagement within a recess portion 16 of the mirror frame assembly 14. In addition to tab 112', a fastener 108 is utilized to secure housing 110 to the rear view mirror frame assembly 14. The fastener 108 passes through a through opening 117 formed in the lower portion 103 of tubular wall 102 and engages rear view mirror frame assembly 14 by engagement with a through opening 18 formed therein.

Thus to install system 100 to a vehicle mirror assembly 10, a cowling portion of the mirror assembly 10 is removed and housing 110 is then slipped on the frame assembly 14 in its place. The portion 116' of tab 112' is engaged within the recess 16 and the through opening 117 is axially aligned with the previously formed through opening 18, for subsequent engagement by the fastener 108, which may be a threaded type fastener, rivet, or the like. Subsequent to mounting, the lamp assembly power lead 126 may be coupled to the vehicle's lighting circuit, and the ground lead 124 suitably coupled to the vehicle's frame. The power lead 126 may be coupled to the vehicle's lighting circuit through a commercially available light control module, such as that available from Kriss Manufacturing Company of Tucson, Arizona for providing isolation from the vehicle's power system and such function as "high" and "low" beam operation.

Figure 9:
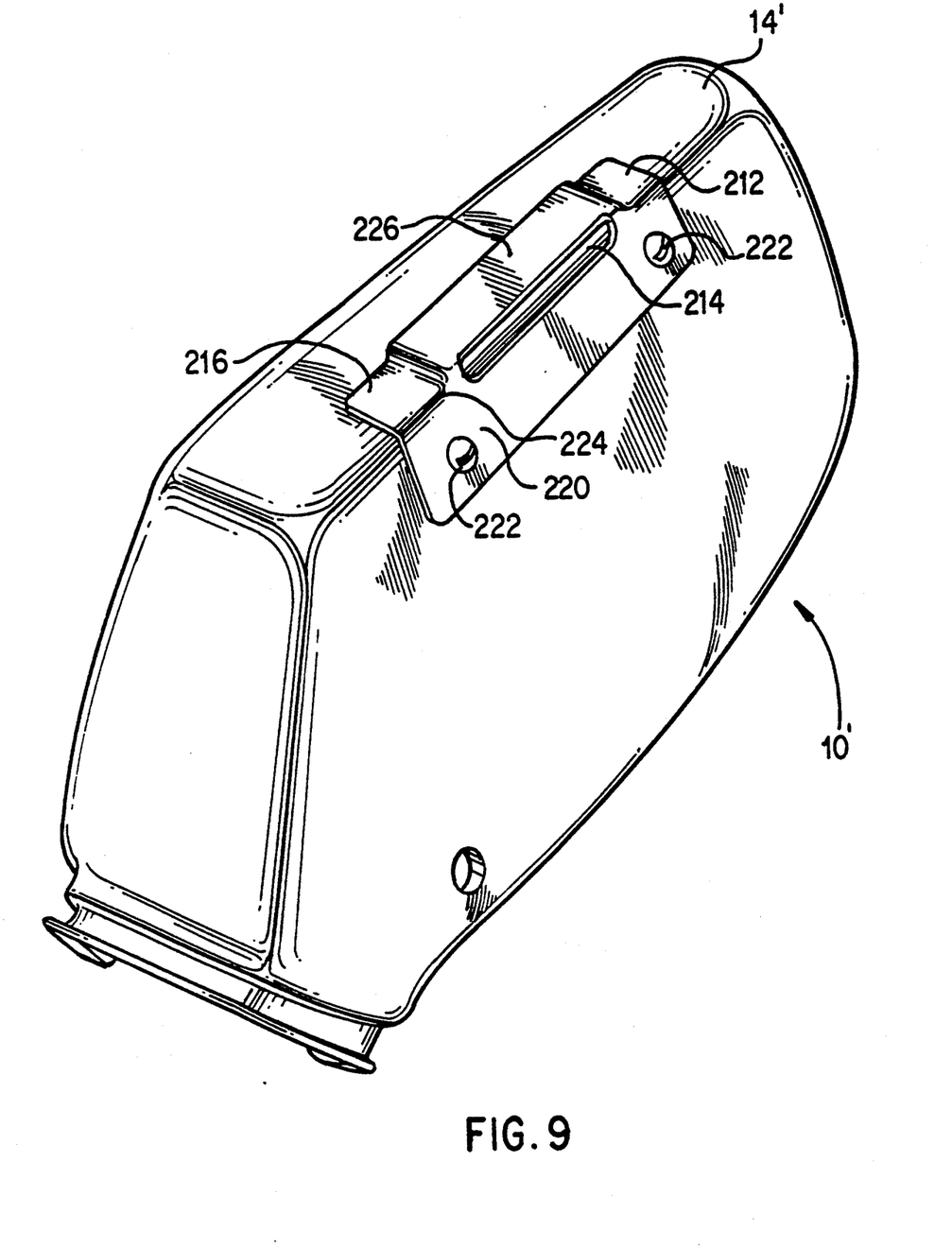
FIG. 9 is a rear perspective view of a vehicle rear view mirror assembly showing the mounting bracket of the integrated driving light system affixed thereto.
Figure 10:
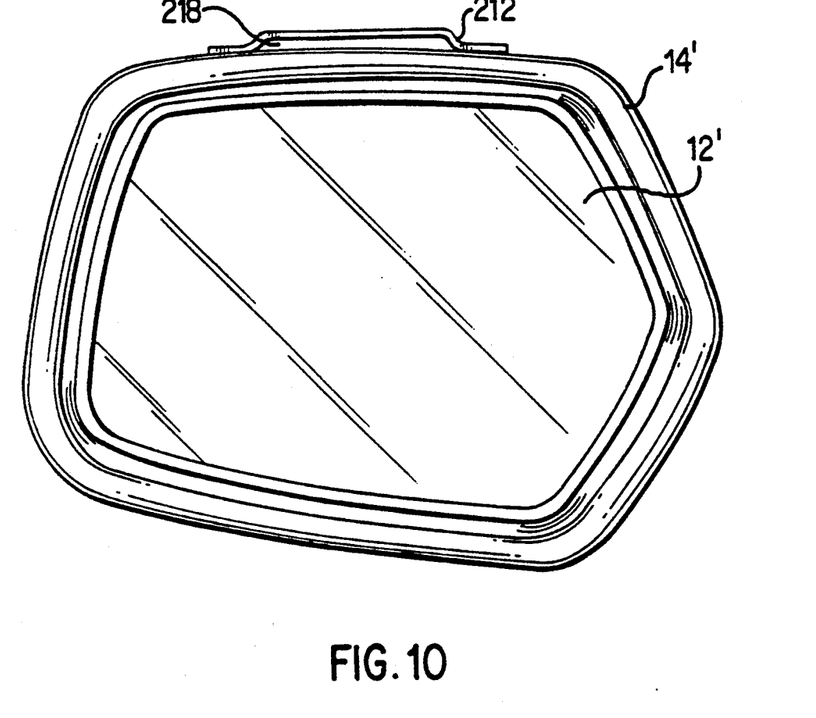
FIG. 10 is a front elevation view of a vehicle rear view mirror assembly showing the mounting bracket of the integrated driving light system affixed thereto; and, FIG. 11 is a partial sectional elevation view of the integrated driving light system depicting an alternate method of coupling to a vehicle rear view mirror assembly.
Figure 11:
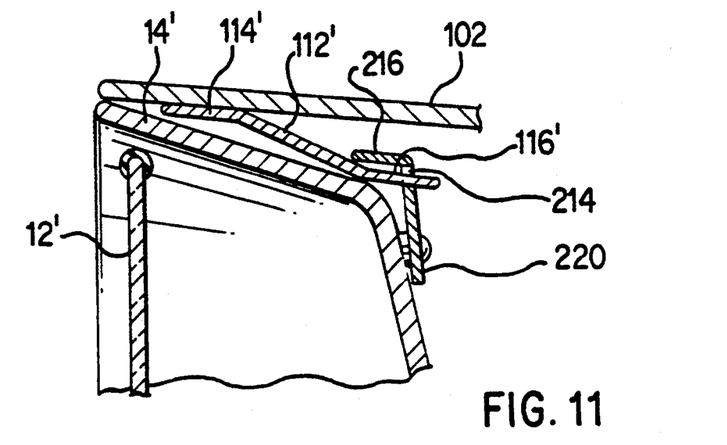

Referring now to FIGS. 9, 10 and 11, there is shown, an alternate mounting system for installing system 100 to a vehicle mirror assembly 10'. The mirror assembly 10' includes a mirror 12' and a cowling, which defines the frame 14' of the mirror assembly, and thus is not removable to expose a support structure. For such installations, system 100 includes a mounting bracket 212 which is secured to the rear surface of the mirror cowling 14' to provide a structure for engagement with the tab 112'. Bracket 212 includes a substantially vertical leg 220 which is secured to the rear surface of cowling 14' by means of a pair of fasteners 222. A slotted through opening 214 is formed at an upper edge 224 of leg 220. The edge 224 defines the interface between vertical leg 220 and the substantially horizontal leg 216. The substantially horizontal leg 216 includes a centrally disposed raised portion 226, defining a passage 218 which extends from the distal edge of leg 216 to through opening 214, the passage 218 providing an insert guideway for tab portion 116'.

Tab 112' has an angular contour for engagement with the insert guideway 218 provided by the mounting bracket 212. Tab 112' includes a first portion 114' fixedly coupled to the interior surface of tubular wall 102. A second portion 116' of tab 112' extends downwardly from the interior surface of tubular wall 102 toward open end 104 for engagement with bracket 212. Thus, system 100 is coupled to the cowling 14' of mirror assembly 10' by engagement of the portion 116' of tab 112' within the insert guideway defined by the passage 218, the housing 110 being positioned over cowling 14' such that the through opening 117, shown in FIG. 4, is axially aligned with a previously formed through opening in the bottom surface of the cowling 14', as was similarly done for the embodiment of FIG. 4.

Figure 8:
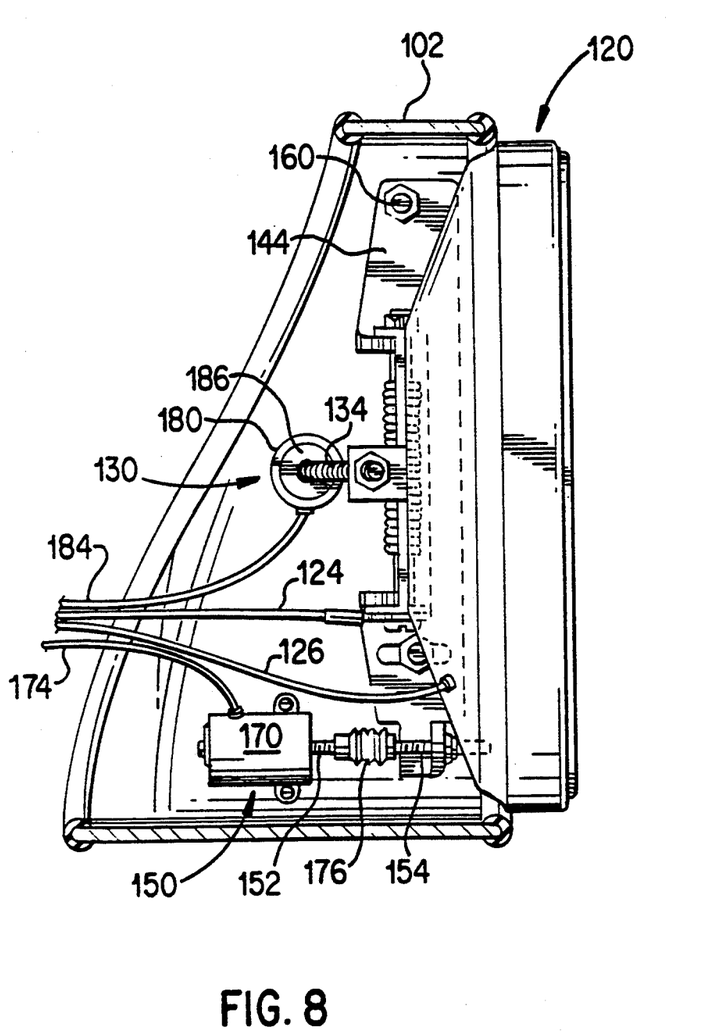
FIG. 8 is a partial sectional plan view of an alternate embodiment of the integrated driving light system.

Referring now to FIG. 8, there is shown, an alternate embodiment of integrated driving light system 100. This embodiment differs from that previously described only in that the manual adjustment utilizing the control knobs 138 and 158 are replaced by drive motors 180 and 170, respectively. Thus, the vertical adjustment assembly 130 includes the drive motor 180 whose output shaft is coupled to the threaded shaft 134 by means of a coupling 186. Vertical drive motor 180 is electrically powered through a pair of leads contained within the power cable 184, and may be selectively driven in either of two opposing rotary directions for displacing the lamp assembly 120 with respect to the bracket 144. Similarly, the horizontal adjustment assembly 150 is provided with a horizontal drive motor 170 having a motor shaft 152 coupled to the threaded shaft 154 by means of a flexible coupling 176. Horizontal drive motor 170 is provided with a pair of power conductors contained within the cable 174 for energizing motor 170 in either of two opposing rotary directions. Horizontal drive motor 170 is therefore able to displace lamp assembly 120 with respect to the pivotal connection 160 of bracket 144.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is being claimed is:

1. An integrated driving light system for a vehicle, comprising:
   a lamp housing having a pair of open opposing ends, said lamp housing being defined by a wall having a tubular contour, said lamp housing being mountable to an external rear viewing mirror assembly of a vehicle at a first of said pair of open opposing ends thereof;
   lamp means disposed in a second of said pair of open opposing ends of said lamp housing for providing additional lighting for a vehicle, said lamp means being coupled to said tubular wall for displacement in two orthogonal directions independent of an adjustable mirror of the rear viewing mirror assembly;
   first means for displacing said lamp means in a first of said two orthogonal directions coupled said tubular wall; and,
   second means for displacing said lamp means in a second of said two orthogonal directions coupled said tubular wall.

2. The integrated driving light system as recited in claim 1 where said lamp means includes: (1) a lamp reflector housing and (2) multi-axis pivot means fixedly coupled to said lamp reflector housing and pivotally coupled to said tubular wall.

3. The integrated driving light system as recited in claim 2 where said multi-axis pivot means includes a first bracket member fixedly coupled to a rear wall of said lamp reflector housing.

4. The integrated driving light system as recited in claim 3 where said multi-axis pivot means further includes a second bracket member hingedly coupled to said first bracket member for rotation about a first axis, said second bracket member being pivotally coupled to said tubular wall for rotation about a second axis, said second axis being orthogonal said first axis.

5. The integrated driving light system as recited in claim 4 where said first displacement means includes: (1) a third bracket member fixedly coupled to said lamp reflector housing in spaced vertical relation with respect to said hinged coupling of said first bracket member to said second bracket member, (2) a first threaded shaft member rotatively coupled to said tubular wall and extending therefrom for threaded engagement with said third bracket member, and (3) a first control knob member affixed to said first threaded shaft member external said lamp housing, whereby rotation of said first control knob member rotates said first threaded shaft member and thereby rotatively displaces said lamp reflector housing about said hinged coupling.

6. The integrated driving light system as recited in claim 4 where said first displacement means includes: (1) a third bracket member fixedly coupled to said lamp reflector housing in spaced vertical relation with respect to said hinged coupling of said first bracket member to said second bracket member, (2) a first drive motor coupled to said tubular wall, and (3) a first threaded shaft member rotatively driven by said first drive motor for threaded engagement with said third bracket member, whereby rotation of first threaded shaft member rotatively displaces said lamp reflector housing about said hinged coupling.

7. The integrated driving light system as recited in claim 5 where said second displacement means includes: (1) a support bracket fixedly coupled to said tubular wall, (2) a second threaded shaft member rotatively coupled to said support bracket and extending therefrom for threaded engagement with a tab portion of said second bracket member, and (3) a second control knob member disposed external said lamp housing and coupled to said second threaded shaft member, whereby rotation of said second control knob member rotates said second threaded shaft member and thereby rotatively displaces said lamp reflector housing about said pivotal coupling of said second bracket member.

8. The integrated driving light system as recited in claim 6 where said first displacement means includes: (1) a second drive motor coupled to said tubular wall, and (2) a second threaded shaft member rotatively driven by said second drive motor for threaded engagement with a tab portion of said second bracket member, whereby rotation of second threaded shaft member rotatively displaces said lamp reflector housing about said pivotal coupling of said second bracket member.

9. The integrated driving light system as recited in claim 4 where said multi-axis pivot means further includes a torsion spring to applying a bias force to said first bracket member with respect to said second bracket member.

10. The integrated driving light system as recited in claim 7 where said second displacement means further includes a flexible shaft member coupled on one end to said second control knob member and on the opposing end to said second threaded shaft member.

11. A system for integrating a driving light with a vehicle's external rear view mirror, comprising:
a lamp housing having a pair of open opposing ends, said lamp housing being defined by a wall having a tubular contour, said lamp housing being mountable to an external rear viewing mirror assembly of a vehicle at a first of said pair of open opposing ends thereof, said tubular wall having an opening formed therethrough adjacent said first open end;
a substantially L-shaped tab member coupled to said tubular wall adjacent said first open end of said lamp housing opposite said through opening, said L-shaped tap member having a first portion affixed to said tubular wall and a second portion extending therefrom for releasable engagement within a recess formed in a first portion of the mirror assembly;
a fastener for engagement with a second portion of the mirror assembly through said through opening formed in said tubular wall;
lamp means disposed in a second of said pair of open opposing ends of said lamp housing for providing additional lighting for a vehicle, said lamp means being coupled to said tubular wall for displacement in two orthogonal directions independent of an adjustable mirror of the rear viewing mirror assembly;
first means for displacing said lamp means in a first of said two orthogonal directions coupled said tubular wall; and,
second means for displacing said lamp means in a second of said two orthogonal directions coupled said tubular wall.

12. The driving light system as recited in claim 11 where said lamp means includes: (1) a lamp reflector housing and (2) multi-axis pivot means fixedly coupled to said lamp reflector housing and pivotally coupled to said tubular wall.

13. The driving light system as recited in claim 12 where said multi-axis pivot means includes a first bracket member fixedly coupled to a rear wall of said lamp reflector housing.

14. The driving light system as recited in claim 13 where said multi-axis pivot means further includes a second bracket member hingedly coupled to said first bracket member for rotation about a first axis, said second bracket member being pivotally coupled to said tubular wall for rotation about a second axis, said second axis being orthogonal said first axis.

15. The driving light system as recited in claim 14 where said first displacement means includes: (1) a third bracket member fixedly coupled to said lamp reflector housing in spaced vertical relation with respect to said hinged coupling of said first bracket member to said second bracket member, (2) a first threaded shaft member rotatively coupled to said tubular wall and extending therefrom for threaded engagement with said third bracket member, and (3) a first control knob member affixed to said first threaded shaft member external said lamp housing, whereby rotation of said first control knob member rotates said first threaded shaft member and thereby rotatively displaces said lamp reflector housing about said hinged coupling.

16. The driving light system as recited in claim 15 where said second displacement means includes: (1) a support bracket fixedly coupled to said tubular wall, (2) a second threaded shaft member rotatively coupled to said support bracket and extending therefrom for threaded engagement with a tab portion of said second bracket member, and (3) a second control knob member disposed external said lamp housing and coupled to said second threaded shaft member, whereby rotation of said second control knob member rotates said second threaded shaft member and thereby rotatively displaces said lamp reflector housing about said pivotal coupling of said second bracket member.

17. The driving light system as recited in claim 14 where said multi-axis pivot means further includes a torsion spring to applying a bias force to said first bracket member with respect to said second bracket member.

18. The driving light system as recited in claim 16 where said second displacement means further includes a flexible shaft member coupled on one end to said second control knob member and on the opposing end to said second threaded shaft member.

19. A Method of integrating a driving light with a vehicle's external rear view mirror assembly, comprising the steps of:

a. providing a tubular lamp lousing having a pair of opposing open ends;
b. providing a substantially L-shaped tab member;
c. fixedly coupling a first portion of said L-shaped tab member to said tubular lamp lousing adjacent a first of said pair of opposing open ends of said lamp housing,
d. forming a through opening in said housing adjacent said first open end thereof opposite said tab member;
e. pivotally coupling a lamp assembly within a second of said pair of opposing open ends for displacement in two orthogonal directions independent of an adjustable mirror of the rear view mirror assembly;
f. engaging a second portion of said L-shaped tab member in a recess formed in a first portion of the rear view mirror assembly; and,
g. engaging a fastener through said housing through opening with an opening formed in a second portion of the rear view mirror assembly.

20. The Method of integrating a driving light as recited in claim 19 where the step of pivotally coupling a lamp assembly includes the step of providing means for independently displacing said lamp assembly in each of two orthogonal directions.

* * * * *